United States Patent [19]

Amon et al.

[11] Patent Number: 5,386,315

[45] Date of Patent: Jan. 31, 1995

[54] IR FAST LOW LIGHT LEVEL LENS SYSTEM

[75] Inventors: Max Amon, Maitland; John Tejada, Oviedo, both of Fla.

[73] Assignee: Martin Marietta Corporation, Bethesda, Md.

[21] Appl. No.: 71,610

[22] Filed: Jun. 4, 1993

Related U.S. Application Data

[63] Continuation of Ser. No. 749,716, Aug. 26, 1991, abandoned.

[51] Int. Cl.⁶ .......................................... G02B 15/16
[52] U.S. Cl. ................................... 359/350; 359/355; 359/356; 359/357
[58] Field of Search ............... 359/350, 355, 356, 357, 359/738, 739, 740

[56] References Cited

U.S. PATENT DOCUMENTS

| | | | |
|---|---|---|---|
| 3,363,962 | 1/1968 | Vogl | 350/2 |
| 3,804,976 | 4/1974 | Gard | 176/6.8 |
| 3,947,084 | 3/1976 | Noyes | 359/357 |
| 4,028,725 | 6/1977 | Lewis | 358/103 |
| 4,199,217 | 4/1980 | Rogers | 359/353 |
| 4,505,535 | 3/1985 | Neil | 350/1.3 |
| 4,586,069 | 4/1986 | Königer et al. | 357/30 |
| 4,621,888 | 11/1986 | Crossland et al. | 350/1.2 |
| 4,679,891 | 7/1987 | Roberts | 359/357 |
| 4,695,119 | 9/1987 | Neil | 350/1.3 |
| 4,705,343 | 11/1987 | Simons | 350/1.3 |
| 4,714,307 | 12/1987 | Palmer | 350/1.3 |
| 4,871,219 | 10/1989 | Cooper | 350/1.4 |
| 4,903,101 | 2/1990 | Maserjian | 357/30 |
| 4,921,318 | 5/1990 | Szumski | 350/1.4 |
| 4,968,117 | 11/1990 | Chern et al. | 359/573 |
| 4,975,567 | 12/1990 | Bishop et al. | 250/211 R |
| 4,989,962 | 2/1991 | Kebo | 350/537 |
| 4,999,005 | 3/1991 | Cooper | 350/1.4 |
| 5,089,910 | 2/1992 | Sigler | 359/357 |
| 5,151,820 | 9/1992 | Sillitto et al. | 359/357 |
| 5,161,051 | 11/1992 | Whitney et al. | 359/357 |
| 5,198,659 | 3/1993 | Smith et al. | 250/214.1 |

OTHER PUBLICATIONS

M. O. Lidwell, "Achromatism of lenses for thermal IR," SPIE, vol. 518, *Optical Systems Engineering IV*, (1984), pp. 73–80.

M. Roberts et al., "Wide waveband infrared optics," Pilkington P.E. Limited, Glascoed Road, St. Asaph, Clwyd, LL17 0LL, UK (1991).

Thomas H. Jamieson, "Ultrawide waveband optics," *Optical Engineering*, Mar./Apr. 1984, vol. 23, No. 2, pp. 111–116.

*Primary Examiner*—Paul M. Dzierzynski
*Assistant Examiner*—Kiet T. Nguyen
*Attorney, Agent, or Firm*—Burns, Doane, Swecker & Mathis

[57] ABSTRACT

A compound lens for use in a low light level system operating in the near-infrared region. The lens system includes a high light-gathering ability requiring both a large aperture and good transmissivity over the wavelengths of interest. A wide field of view (e.g., 50°) without excessive chromatic and geometric aberrations that generally accompanies systems with a large aperture is provided. Space is provided in the lens system for a variable iris and variable density spot subassembly. Desired optical quantities are obtained through the use of zinc selenide as the material for an aspheric lens. The use of this diamond-turnable infrared material as a field lens yields exceptional performance for a fast (e.g., F/1.25) lens with a wide field of view.

6 Claims, 2 Drawing Sheets

IR FAST LOW LIGHT LEVEL LENS SYSTEM

This application is a continuation of patent application Ser. No. 07/749,716, filed Aug. 26, 1991, now abandoned.

FIELD OF THE INVENTION

This invention relates to an optical system designed for low light level (LLL) systems.

DESCRIPTION OF RELATED ART

Previous low light level lens designs are fast in that they gather sufficient quantities of light for detection at extremely low light levels. These lens designs, however, cover a modest field of view of 40° or less. A wide field of view is preferred for certain applications such as ground or airborne navigation.

It is the balancing of the higher order off-axis aberrations (coma, astigmatism, lateral color, and distortion) that are most troublesome in the design of a fast wide angle lens system. Additionally, sufficient back focus must be provided so that the lens may be adjusted in the factory to compensate for fabrication and assembly tolerances.

SUMMARY OF THE INVENTION

One object of the present invention is to provide an objective lens for a low light level system which uses fast optics to collect as much light as possible and produce a high quality image of a scene.

Another object of the invention is to provide a low light level lens system with an extended field of view.

Yet another object of the invention is to provide a low light level lens system with sufficient back focus capabilities to permit factory focus adjustment.

The present invention meets the above criteria by providing a nine element lens system that will fit a typical low light level system package while fulfilling the requirements of a low light level system.

Off-axis performance is greatly enhanced by employing a high refractive index material for the field lenses. Zinc selenide, which is typically reserved for use in system designed to operate in the far infrared (i.e., 3 to 12 microns) range is used for purposes of the present invention in the near infrared or visual range.

Off-axis performance may be further improved by employing an aspheric surface on one of the zinc selenide field lenses. The aspheric surface constants provide additional variables for the optimization process. The resultant design has exceptional performance throughout the field of view. Most of the field operates at full aperture. The system is permitted to vignette, starting at approximately ±20° off axis and up to 50% of the aperture at full field (±25% off axis).

The aspheric surfaces may be advantageously produced by a diamond turning process. A diamond turned aspheric surface is suitable in the present application because the surface quality (departure from the ideal surface) of the field lens is not as critical as it is for the components used in the aperture. The surface tolerance is therefore comparable to that used for infrared systems with the exception that a post polish is required to remove the diamond turning marks and make the surface smooth.

In addition to the basic optical requirements of the lens system, space may be provided for an auto-iris. The auto-iris will limit the amount of light permitted to fall on the photocathode. This will protect the tube from damage if a bright target were to enter the field of view. Additionally, the auto-iris may be accompanied by a variable density spot in the center of the lens element near the aperture stop. This spot on the center will cause a small transmission loss when the aperture is wide open, but will permit the system to operate at a reasonable f/number when bright sources enter the field of view.

BRIEF DESCRIPTION OF THE DRAWINGS

The preferred embodiments of the present invention will now be described by way of example with reference to the accompanying schematic drawings and table, wherein like numbers refer to like elements, in which.

DESCRIPTION OF THE PREFERRED EMBODIMENTS

Figure 1:
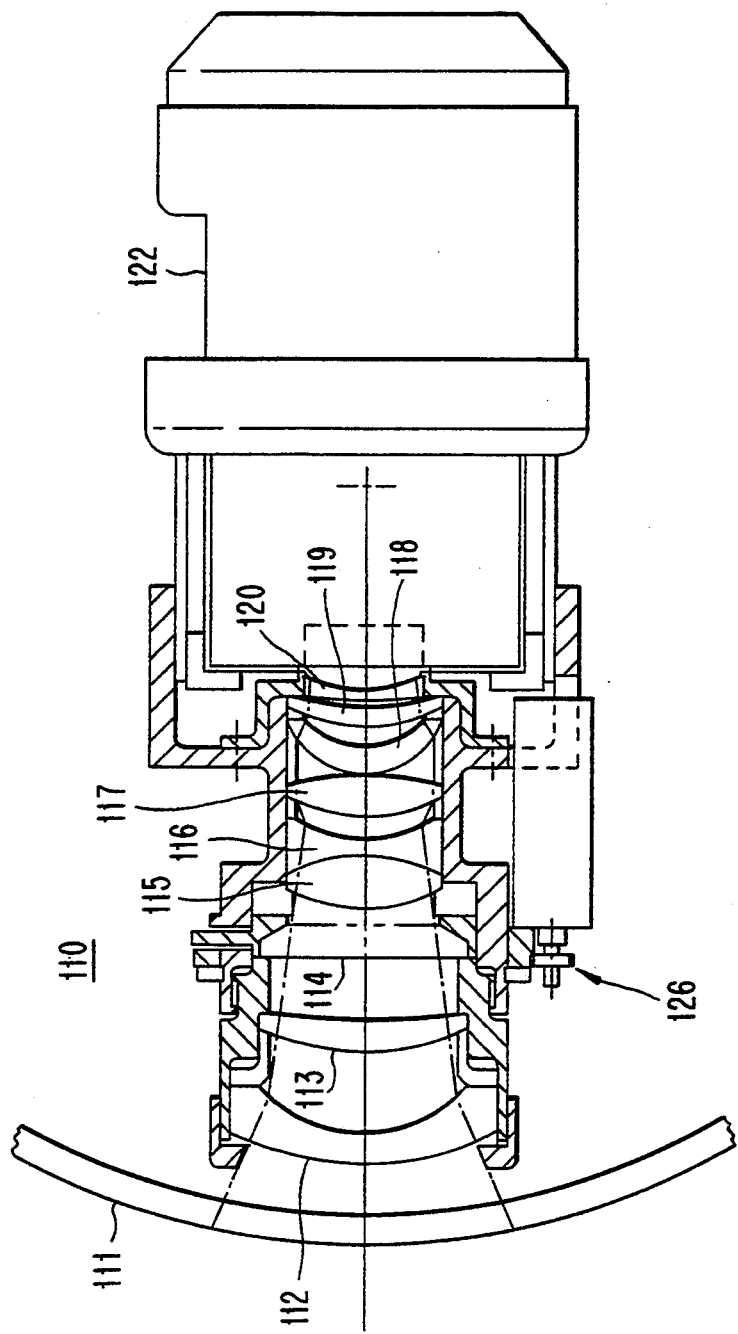
FIG. 1 is an optical diagram of a preferred embodiment of the present invention.

FIG. 1 illustrates a presently preferred lens layout of the new lens form. It is a nine element lens system, including a dome shaped window, that will fit in a typical low light level system package. Specifically, the lens system comprises a concentric window (dome) 111, a negative meniscus lens 112, a positive meniscus lens 113, a null planar window 114, a positive double convex lens 115 in contact with a negative double concave lens 116, a positive double convex lens 117 followed by a positive meniscus lens 118, followed by a positive meniscus lens 119 and a negative meniscus lens 120. This lens system focuses infrared radiation on an image intensifier 122.

The specific optical characteristics of the lens system of the presently preferred embodiment appears below in Table I. Table I is an ACCOSV (an optical design computer program sold by Scientific Calculations, Inc., a division of the Harris Corporation, 7796 Victor Mendon Road, P.O. Box H, Fishers, N.Y. 14453) listing of the lens system construction parameters and identifies the aspheric deformations.

TABLE I

| | | | BASIC LENS DATA | | | |
|---|---|---|---|---|---|---|
| ELEMENT | SURFACE NUMBER | RADIUS | THICKNESS | MEDIUM | REFRACTIVE INDEX | DISPERSION FACTOR |
| | 0 | 0.00000000 | 1.00000000E+10 | AIR | | |
| | 1 | 0.00000000 | −1.33962709 | AIR | | |
| 111 | 2 | 3.02950000 | 0.16000000 | MATL SILICA | 1.453322 | 39.466 |
| | 3 | 2.86950000 | 0.28000000 | AIR | | |
| 112 | 4 | 1.38248000 | 0.15748000 | SCHOTT LAK9 | 1.681792 | 0.001 |
| | 5 | 0.70122000 | 0.46961500 | AIR | | |
| 113 | 6 | 1.25596000 | 0.15527559 | SCHOTT SF56 | 1.764913 | 1.061 |
| | 7 | 3.68400000 | 0.23918300 | AIR | | |
| 114 | 8 | 0.00000000 | 0.08000000 | SCHOTT BK7 | 1.510780 | 0.384 |

TABLE I-continued

| | | | | | | |
|---|---|---|---|---|---|---|
| | 9 | 0.00000000 | 0.12085600 | AIR | | |
| | 10 | 0.00000000 | 0.11600000 | AIR | | |
| 115 | 11 | 0.81102000 | 0.27559055 | SCHOTT LAK9 | 1.681792 | 0.001 |
| 116 | 12 | −0.81103000 | 0.08415354 | SCHOTT SF56 | 1.764913 | 1.061 |
| | 13 | 0.64814000 | 0.10478000 | AIR | | |
| 117 | 14 | 0.81103000 | 0.21653543 | SCHOTT LAK9 | 1.681792 | 0.001 |
| | 15 | −1.37150000 | 0.00500000 | AIR | | |
| 118 | 16 | 0.45857000 | 0.14025590 | SCHOTT LAK9 | 1.681792 | 0.001 |
| | 17 | 0.40457000 | 0.10000000 | AIR | | |
| 119 | 18 | 0.77580000 | 0.09842520 | MATL RZNSE | 2.524186 | 2.427 |
| | 19 | 1.08952000 | 0.03937008 | AIR | | |
| 120 | 20 | 1.38248000 | 0.06889764 | MATL RZNSE | 2.524186 | 2.427 |
| | 21 | 0.70122000 | 0.11811023 | AIR | | |
| | 22 | 0.00000000 | 0.22047244 | MATL SILICA | 1.453322 | 39.466 |
| | 23 | 0.00000000 | −0.88487939 | AIR | | |
| | 24 | 0.00000000 | 0.88487939 | AIR | | |
| | 25 | 0.00000000 | 0.00000000 | AIR | | |

CONIC CONSTANT AND ASPHERIC DATA

| Surface | Conic Constant | AD | AE | AF | AG |
|---|---|---|---|---|---|
| 19 | 8.96959E+00 | 1.88519E−01 | −1.54350E+00 | −3.47649E−01 | 1.87313E+02 |

Wherein AD, AE, AF, and AG represent the 4th, 6th, 8th and 10th order deformation coeffecients, respectively.

OPERATING CONDITIONS

| Effective Focal | Back Focus | F/Number | Length | Gauss Image Height |
|---|---|---|---|---|
| 0.7874 | 0.0000 | 1.25 | 3.2500 | 0.3670 |

| Reference Object Height | Reference Aperture Height | Object Surface | Reference Surface | Image Surface |
|---|---|---|---|---|
| −0.466308e+10 | (25.0000 DG) | 0.34914 | 0 | 10 | 25 |

DESIGN WAVELENGTHS

| WAVL NBR | 1 | 2 | 3 | 4 | 5 |
|---|---|---|---|---|---|
| WAVELENGTH | 0.80000 | 0.70000 | 0.75000 | 0.85000 | 0.90000 |
| SPECTRAL WT | 1.0000 | 1.0000 | 1.0000 | 1.0000 | 1.0000 |

APERTURES

| SURFACE | TYPE | SEMI CLEAR APERTURES |
|---|---|---|
| 2 | CIRCLE | 0.7940 |
| 3 | CIRCLE | 0.7350 |
| 4 | CIRCLE | 0.5900 |
| 5 | CIRCLE | 0.4850 |
| 6 | CIRCLE | 0.4450 |
| 7 | CIRCLE | 0.4350 |
| 8 | CIRCLE | 0.4050 |
| 9 | CIRCLE | 0.3950 |
| 10 | CIRCLE | 0.3491 |
| 11 | CIRCLE | 0.3481 |
| 12 | CIRCLE | 0.3400 |
| 13 | CIRCLE | 0.3200 |
| 14 | CIRCLE | 0.3550 |
| 15 | CIRCLE | 0.3550 |
| 16 | CIRCLE | 0.3500 |
| 17 | CIRCLE | 0.3050 |
| 18 | CIRCLE | 0.3050 |
| 19 | CIRCLE | 0.2850 |
| 20 | CIRCLE | 0.2900 |
| 21 | CIRCLE | 0.2800 |
| 22 | CIRCLE | 0.3150 |
| 23 | CIRCLE | 0.3900 |
| 24 | CIRCLE | 0.6791 |

APERTURE STOP AT SURF 10 (EN AND EX ADJUSTMENTS)

Table I lists the basic lens data such as the actual elements by element number, the actual and imaginary surfaces by a surface number, the radius of the various surfaces wherein a listing of zero corresponds to a flat surface a listing of the thickness or spacing between the surfaces, the medium into which the light rays are passing such as air, silica, Schott LAK9, SF56, BK7 (supplier's material designations), and Zinc Selenide RZNSE, the refractive indices, and dispersion factors. After the basic lens data, Table I lists the conic constants and aspheric data as well as the clear apertures, operating conditions and design wavelengths. In the optical system specified in Table I, the aperture stop is positioned at surface 10 and the lens units are in inches.

The off-axis performance of the lens system is improved by the use of high refractive index glass and the liberal use of advanced optical design optimization programs such as the ACCOSV design computer program. The off-axis performance is greatly enhanced by employing even higher refractive index material for the field lenses, i.e., positive meniscus lens 119 and negative meniscus lens 120. One such material is zinc selenide which is typically reserved for use in systems designed to operate in the far infrared (i.e., 3 to 12 micron) range, but is rarely used in the visual or near infrared range. However, this material transmits very well in the 700 to 900 nm spectral range and provides a means to improve the off-axis performance of the system. The vertices of the lens elements 111-120 and the principal axis of the image intensifier 122 lie along a the optical axis (or chief ray) 124 of the system.

Figure 2:
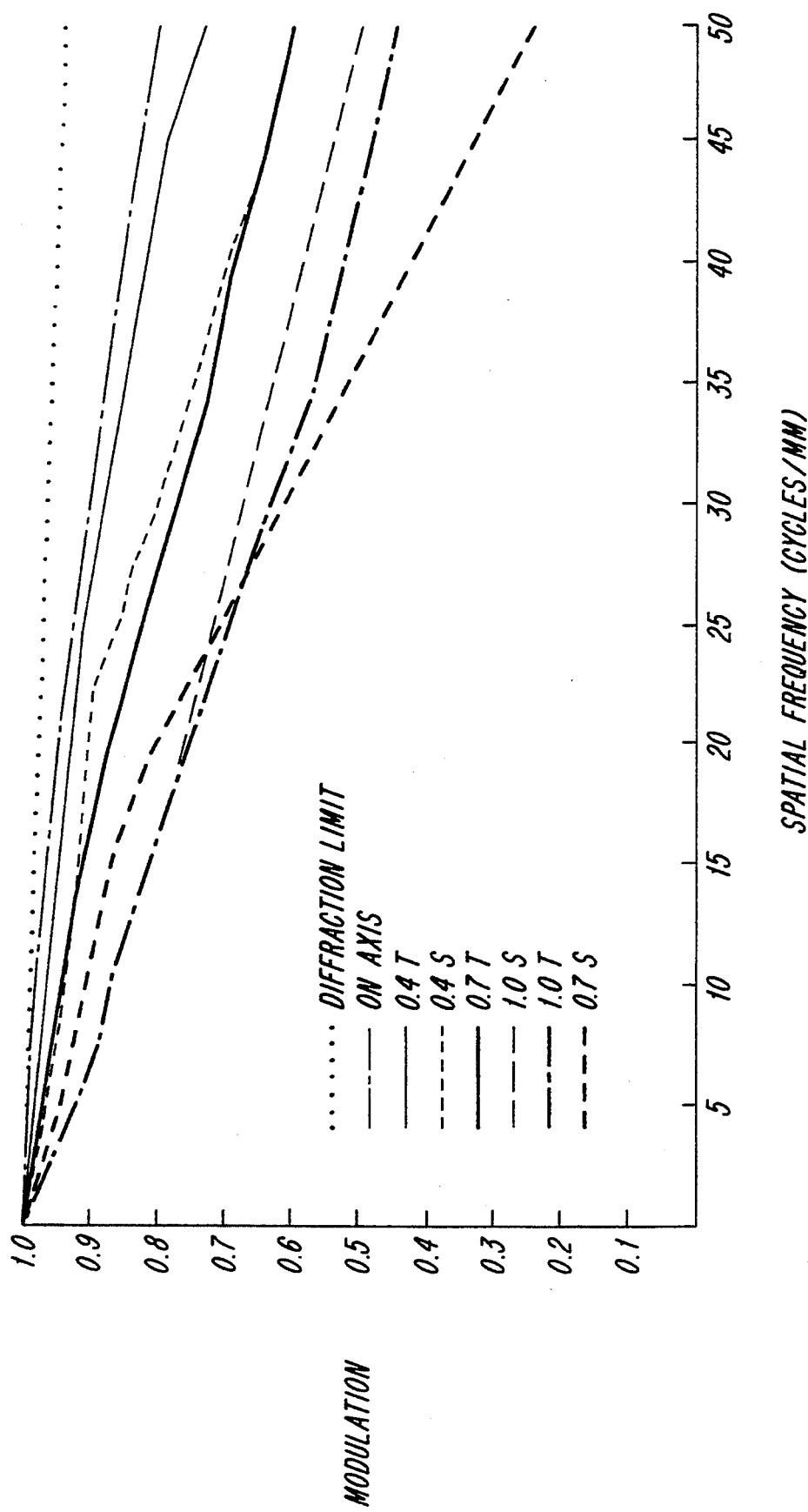
FIG. 2 is a graphical representation of the optical modulation transfer function.

The off-axis performance may be further improved by employing an aspheric surface on one of the zinc selenide field lenses such as at any of the last four surfaces of field lenses 119 and 120. The aspheric surface constants provide additional variables for the optimization process using a computer iterated design program. The resulting design has exceptional performance throughout the field of view. The performance is reflected in the modulation transfer function (MTF) shown in FIG. 2. This graph shows the modulation in comparison to the spatial frequency (cycles per mm). The diffraction modulation transfer function is represented for the wavelengths of 700, 750, 800, 850 and 900 nm.

By the use of zinc selenide as the material for the aspheric lens, the present invention obtains the desired optical qualities along with the ability to use a machining method employing diamond turning for a controllable, non-spherical lens shape with an acceptable surface profile. This aspect of the invention is particularly advantageous since the cost of aspheric surfaces has been significantly reduced in recent years by the introduction of the diamond turning of optical parts.

A diamond turned aspheric surface is suitable for the present application because the surface quality of the field lens is not as critical as is the surface quality of components used in the aperture. The surface tolerance is therefore comparable to that used for infrared systems with the exception that a post polish step is required to remove the diamond turning marks and make the surface finish smooth, which is important for a field lens.

Zinc selenide has an index of refraction of over 2.4 as opposed to the index of refraction of 1.9 or less for most optical glasses as used in the prior art.

In addition to the basic optical requirements of the lens system, the system may also provide space for a variable transmission obstruction 126. The variable transmission obstruction 126 will limit the amount of light permitted to fall on the photocathode in the image intensifier 122. The variable transmission obstruction 126 may be as simple as an auto-iris such as an radially varying transmission N.D. filter located adjacent null planar window 114. This will protect the tube 122 from damage if a bright target were to enter the field of view. The variable transmission obstruction 126 is not necessary to the operation of the system 110 for most applications.

The sensitivity of the image intensifier 122 is such that it may drive the iris 126 to the size of a pin hole when a bright source enters the field of view. This would render the present system so slow that the diffraction effects would significantly reduce the systems performance. However, this situation may be avoided by locating a variable density spot in the center of the lens element near the aperture stop. The variable density spot may be a dot coating on a surface of the null planar window 114. The spot on the center will cause a small transmission loss when the aperture is wide open, but will permit the system to operate at a reasonable f/number when bright sources enter the field of view.

As can be seen from the above, the low light level system described herein will have a 30×40×50 degree field of view and therefore be compatible with a forward looking infrared system. Assuming the above field of view, the lens would be required to have a 19.3 mm focal length assuming an 18.0 mm format for the image intensifier 22 as illustrated by the equation EFL=18.0 mm/(2.0×tan 25°) where EFL=effective focal length.

The 25 mm focal length commercial lens or lenses designed for ANVIS goggles could serve at least for a rough and ready system. This system is desirable because it can be quickly acquired and inexpensively constructed. However, there are several factors that mitigate against the use of such commercial lenses. These factors include the fact that commercial lenses are typically designed to operate in the visual spectral range, whereas the present invention will principally operate from the 700 to 900 nm range. Also, commercial optics that are designed for the correct spectral range cover a smaller field of view. Additionally, the lens system would likely be located behind a dome-shaped window to make it compatible with a typical infrared lens system package. Although the dome 111 has a relatively low power and has a relatively small effect on the aberrations of the system, these effects cannot be totally eliminated by refocusing and therefore it is desirable to design the lens system with the dome 111 as an integral part. For the foregoing reasons, a lens system may be designed for the low light level system herein disclosed to meet specific requirements of the desired system if conventional designs will not yield the performance needed.

The description provided herein is intended to be illustrative only and not intended to be limiting. Those skilled in the art may conceive many modifications to the disclosed embodiments. However, any such modifications which fall within the purview of the description are included in the scope of the invention as well. The scope of this invention shall be determined from the scope of the following claims.

We claim:

1. A low light level lens system, comprising:
   a multiple element lens system designed to operate in the near-infrared region of 0.7 to 0.9 μm,
   wherein at least one element comprises a zinc selenide lens element, said lens system having a wide field of view, and wherein the multiple element lens system comprises, in order of their appearance on a chief ray, a first negative meniscus lens, a first positive meniscus lens, a null planar window, a positive double convex lens in contact with a negative double concave lens, a positive double convex lens followed by contact with a positive meniscus lens, a second positive meniscus lens, and a second negative meniscus lens.

2. The low light level lens system according to claim 1 further comprising a concentric dome window as a tenth element.

3. A low light level lens system for operating in the near-infrared region of 0.7 to 0.9 μm, comprising:
   a multiple element lens system wherein at least one element comprises a zinc selenide lens element, said lens system having a wide field of view; and
   a variable transmission obstruction including an auto-iris and level lens system according to claim 1 wherein the variable transmission obstruction a variable density spot at the center of a lens element near an aperture stop.

4. A low light level lens system for Operating in the near-infrared region of 0.7 to 0.9 μm, comprising:
   a multiple element lens system wherein at least one element comprises a zinc selenide lens element, said lens system having a wide field of view, wherein the multiple element lens system comprises the following basic lens data:

| SURFACE NUMBER | RADIUS | THICKNESS | MEDIUM | REFRACTIVE INDEX | DISPERSION FACTOR |
|---|---|---|---|---|---|
| 0 | 0.00000000 | 1.00000000E+10 | AIR | | |
| 1 | 0.00000000 | −1.33962709 | AIR | | |
| 2 | 3.02950000 | 0.16000000 | MATL SILICA | 1.453322 | 39.466 |

-continued

| SURFACE NUMBER | RADIUS | THICKNESS | MEDIUM | REFRACTIVE INDEX | DISPERSION FACTOR |
|---|---|---|---|---|---|
| 3 | 2.86950000 | 0.28000000 | AIR | | |
| 4 | 1.38248000 | 0.15748000 | SCHOTT LAK9 | 1.681792 | 0.001 |
| 5 | 0.70122000 | 0.46961500 | AIR | | |
| 6 | 1.25596000 | 0.15527559 | SCHOTT SF56 | 1.764913 | 1.061 |
| 7 | 3.68400000 | 0.23918300 | AIR | | |
| 8 | 0.00000000 | 0.08000000 | SCHOTT BK7 | 1.510780 | 0.384 |
| 9 | 0.00000000 | 0.12085600 | AIR | | |
| 10 | 0.00000000 | 0.11600000 | AIR | | |
| 11 | 0.81102000 | 0.27559055 | SCHOTT LAK9 | 1.681792 | 0.001 |
| 12 | −0.81103000 | 0.08415354 | SCHOTT SF56 | 1.764913 | 1.061 |
| 13 | 0.64814000 | 0.10478000 | AIR | | |
| 14 | 0.81103000 | 0.21653543 | SCHOTT LAK9 | 1.681792 | 0.001 |
| 15 | −1.37150000 | 0.00500000 | AIR | | |
| 16 | 0.45857000 | 0.14025590 | SCHOTT LAK9 | 1.681792 | 0.001 |
| 17 | 0.40457000 | 0.10000000 | AIR | | |
| 18 | 0.77580000 | 0.09842520 | MATL RZNSE | 2.524186 | 2.427 |
| 19 | 1.08952000 | 0.03937008 | AIR | | |
| 20 | 1.38248000 | 0.06889764 | MATL RZNSE | 2.524186 | 2.427 |
| 21 | 0.70122000 | 0.11811023 | AIR | | |
| 22 | 0.00000000 | 0.22047244 | MATL SILICA | 1.453322 | 39.466 |
| 23 | 0.00000000 | −0.88487939 | AIR | | |
| 24 | 0.00000000 | 0.88487939 | AIR | | |
| 25 | 0.00000000 | 0.00000000 | AIR | | |

5. A low light level lens system comprising:

a single-band multiple element lens system designed to operate in the near-infrared region of 0.7 to 0.9 μm, wherein at least one element comprises a high index, diamond turnable lens, said lens system having a wide field of view and wherein the multiple element lens system comprises, in order of their appearance on a chief ray, a first negative meniscus lens, a first positive meniscus lens, a null planar window, a positive double convex lens in contact with a negative double concave lens, a positive double convex lens followed by contact with a positive meniscus lens, a second positive meniscus lens, and a second negative meniscus lens.

6. A low light level lens system comprising:

a single-band multiple element lens system designed to operate in the near-infrared region of 0.7 to 0.9 μm, wherein at least one element comprises a high index, diamond turnable lens, said lens system having a wide field of view: and a variable transmission obstruction, wherein the variable transmission obstruction further comprises a variable density spot at the center of a lens element near an aperture stop.

* * * * *